US005427024A

United States Patent [19]

Firth

[11] Patent Number: 5,427,024

[45] Date of Patent: Jun. 27, 1995

[54] METHOD AND ARRANGEMENT FOR REMOVAL OF A FINISH-PRINTED PRODUCT FROM A SCREEN TABLE

[76] Inventor: Gregory S. Firth, 1714 Countryside Dr., Vista, Calif. 92083

[21] Appl. No.: 166,711

[22] Filed: Dec. 14, 1993

[51] Int. Cl.$^6$ ........................ B41F 15/12; B65G 47/02; B65G 49/00

[52] U.S. Cl. ........................................ 101/126; 101/44; 101/129; 198/468.6

[58] Field of Search .................... 101/43, 44, 114, 115, 101/118, 126, 129, 408, 474; 38/102.91; 223/111; 198/468.01, 468.6; 414/416; 271/85, 268; 294/81.61, 87.1

[56] References Cited

U.S. PATENT DOCUMENTS

| | | | |
|---|---|---|---|
| 3,161,543 | 12/1964 | Borders et al. | 101/126 |
| 4,031,824 | 6/1977 | Bubley et al. | 101/126 |
| 4,242,956 | 1/1981 | Bubley et al. | 101/408 |
| 4,875,268 | 10/1989 | Szarka | 101/126 |

*Primary Examiner*—Edgar S. Burr
*Assistant Examiner*—Stephen R. Funk

[57] ABSTRACT

Provided is a method and apparatus for grasping, lifting, removing, and dropping a finish-printed product, for example, a T-shirt from a screen table which serves as a platform for the screen-printing process. The apparatus employs a gripping device which grips portions of a T-shirt that hang over opposite edges of the screen table. Once the T-shirt is gripped, it is lifted vertically from the printing platform, moved horizontally away from the printing platform, and then dropped, preferably, upon a conveyor dryer assembly.

2 Claims, 6 Drawing Sheets

METHOD AND ARRANGEMENT FOR REMOVAL OF A FINISH-PRINTED PRODUCT FROM A SCREEN TABLE

FIELD OF INVENTION

The present invention relates to a method for removing a finish-printed product, for example a T-shirt, from a screen table designed with an adhesive top side and two side edges which are approximately parallel to a direction of removal, onto which screen table the product was pulled before the printing operation was begun, in order to serve as an underlayer for the product during said operation, during which the part of the product located under the table hangs loosely under said table, and for placing the product after removal on a dryer conveyor.

The invention also relates to an arrangement for removal of a finish-printed product, such as a T-shirt, from a screen table designed with an adhesive top side and with two side edges which are approximately parallel to a direction of removal, onto which screen table the product is intended to be pulled before the printing operation is begun, in order to serve during this operation as an underlayer for the product, which, during the printing operation, has a part hanging loosely under the screen table, and in order to place the product, after removal thereof, on a dryer conveyor, the arrangement comprising a stand and, mounted movably thereon, at least in the direction of removal, removal members designed to be brought into engagement with the finish-printed product.

For printing with an automatic screen printing machine with rotating screen table, two or even three persons are usually required; one for pulling the products onto the screen tables at the rate at which these pass the pulling-on zone, and one or two persons for removing the finish-printed products as these pass the removal zone, which often lies immediately in front of the pulling-on zone. Also, in the case of a manual screen printing machine, three operators are required, the third carrying out the actual screen printing.

For printing T-shirts, in particular, the time and cost factors are crucial in determining whether or not an order is obtained in competition with other printers. T-shirts are often ordered with a short delivery time, for example for a specific event, and are expected to be supplied at a low price.

The high pace of printing, which is the result of ever more intensive time and cost pressures, increases the risk of work injuries to the operating staff.

An object of the present invention is to eliminate the abovementioned disadvantages, and this is achieved, in the method according to the invention, in that the product is pressed against the underside of the table within areas lying inside and along substantially the entire length of said edge lines, in that the product material in said areas, while the friction between said areas of the product and the underside of the table is overcome and with stretching of said loose part, is conveyed in opposite horizontal directions so that each respective area comes to lie on the opposite side of each respective edge line in order to be clamped there, in that a vertical relative movement is executed between said clamped areas and the table so that the product is released from the adhesive top side of the table and in that the product is displaced in the direction of removal, after which the clamping is loosened so that the product is able to drop onto the dryer conveyor.

An arrangement which is capable of carrying out the method according to the invention is characterized in that said removal members in the area around each of said side edges have an upwardly directed engagement surface and a downwardly directed counter-pressure surface, in that the engagement surface is designed to press a portion of the loosely hanging part of the product against the underside of the table within the associated edge line, in that said removal members or their engagement surface are displaced, while overcoming the friction between the underside of the table and the product and stretching the loose part, in opposite directions transverse to the direction of removal, in that the engagement surface subsequently, while clamping the product, presses the latter against the counter-pressure surface, in that, by means of a relative movement between the removal members, the product is released from the adhesive top side of the table, and in that, after a horizontal displacement in the direction of removal, so that the product is situated outside the screen table, the clamping is released so that the product drops onto the dryer conveyor.

BRIEF DESCRIPTION OF THE DRAWINGS

The invention will be explained further hereinbelow with reference to the attached drawing, in which.

DESCRIPTION OF PREFERRED EMBODIMENT

Figure 1:
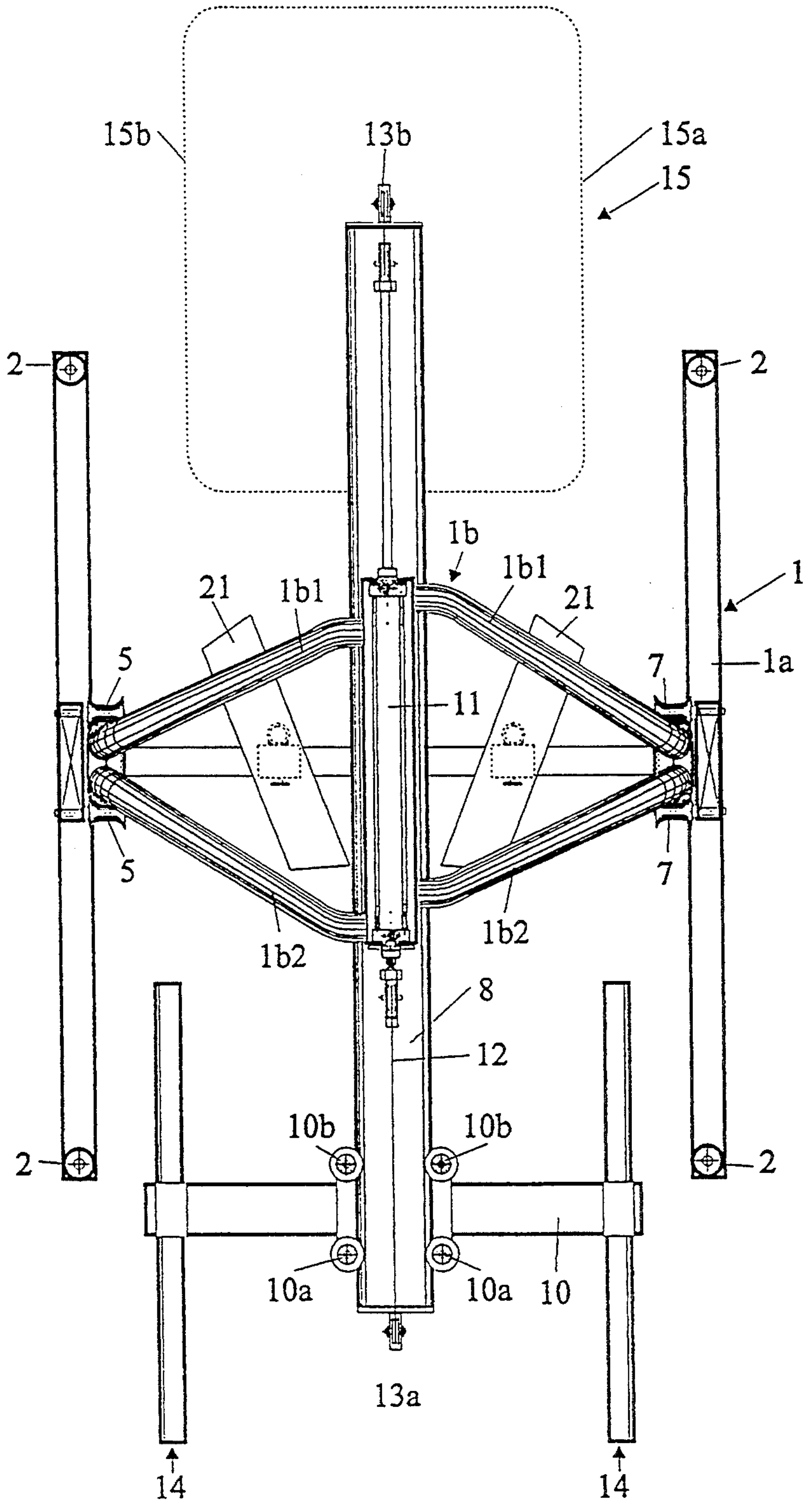
FIGS. 1–3 are plan views which show diagrammatically, from above, from the removal side and, respectively, in a side view transverse to the direction of removal, an embodiment of an arrangement according to the invention.

In the drawing, 1 generally designates a stand with a lower stand part *1a* designed to rest via feet 2 on an approximately level support surface, and a stand upper part *1b* which is arranged in such a way that it can be raised and lowered relative to the lower stand part *1a*, for adjustment of the machine height, by means of cylinder/piston assembly 3. The feet 2 can be adjusted individually in height in order to compensate for the support surface. The stand lower part *1a* comprises two vertical columns ***1a*1 and *1a*2 with roller pairs 4, 5 and 6, 7, respectively, arranged at a mutual spacing in the vertical direction. The stand upper part *1b* comprises two generally U-shaped elements *1b*1, *1b*2 of tubular profile, which bear a traverse beam 8 and whose downwardly directed branches are mounted between said roller pairs 4, 5 and 6, 7, respectively, in order to permit said raising and lowering ability of the stand upper part *1b*. Incorporated in an operative connection between the cylinder/piston assembly 3, which comprises two assembly units *3a*, *3b* in the embodiment shown in the drawing, is a further cylinder/piston assembly 9, which will be described in greater detail hereinbelow. The assembly 9 acts between a yoke *3c*, which joins the piston rod ends of the assemblies *3a*, *3b* and a crossbeam *1b*3 arranged between the downwardly directed branches of the elements *1b*1, *1b*2**.

A beam 10 arranged transversely to the traverse beam 8 is readily displaceable, by means of two roller pairs 10*a*, 10*b* arranged on both sides of the traverse beam 8, along the latter between two end positions, which will be described hereinbelow. The displacement of the beam 10 along the traverse beam 8 is effected with the aid of a double-acting cylinder/piston assembly 11 and a system consisting of a circling cord 12 and guide rollers 13*a* and 13*b*, respectively.

The crossbeam 10 bears two removal members 14, which are identical to one another and which constitute the actual essential feature of the present invention. The mutual positions of the removal members 14 and their positions along the beam 10 are adjustable, the fixing of the removal members 14 on the beam 10 being effected by means of tightening screws, which are manually tightened by means of knobs 14*a*.

In FIG. 1 the dotted line indicates a screen table 15 with an adhesive top side and with two side edges 15*a*, 15*b*, which are approximately parallel to each other and which extend in the direction of extension of the traverse beam 8, which direction is also referred to hereinbelow as the direction of removal of the products 17. The purpose of the table 15 is to serve as an underlayer for a product during a printing operation.

Several such screen tables 15 are usually arranged in a carousel configuration and are intended to be stopped at predetermined work stations for pulling-on of a product, printing with different colours, and for removal of the finish-printed product. The station shown in FIG. 1 is assumed to be the removal station, which also represents one end position of the removal members 14. The removal members 14 are here situated in their second end position directly above a dryer conveyor 16, the purpose of which is to convey the finish-printed products, during drying thereof, to a packing station not shown in the drawing.

The product, which is shown diagrammatically in FIG. 6 and is designated by 17, is pulled, at a pulling-on station, onto the respective screen table so that the side of the product which is to be printed is fixed in a smoothed-out manner by the adhesive top side 15*c* of the screen table 15, while the part 17*a* located under the table 15 hangs loosely under the table. It is obvious that products of various sizes can be handled by the invention, as is the case when printing the chest part or back part of a T-shirt, or when printing on its sleeves.

Figure 4:
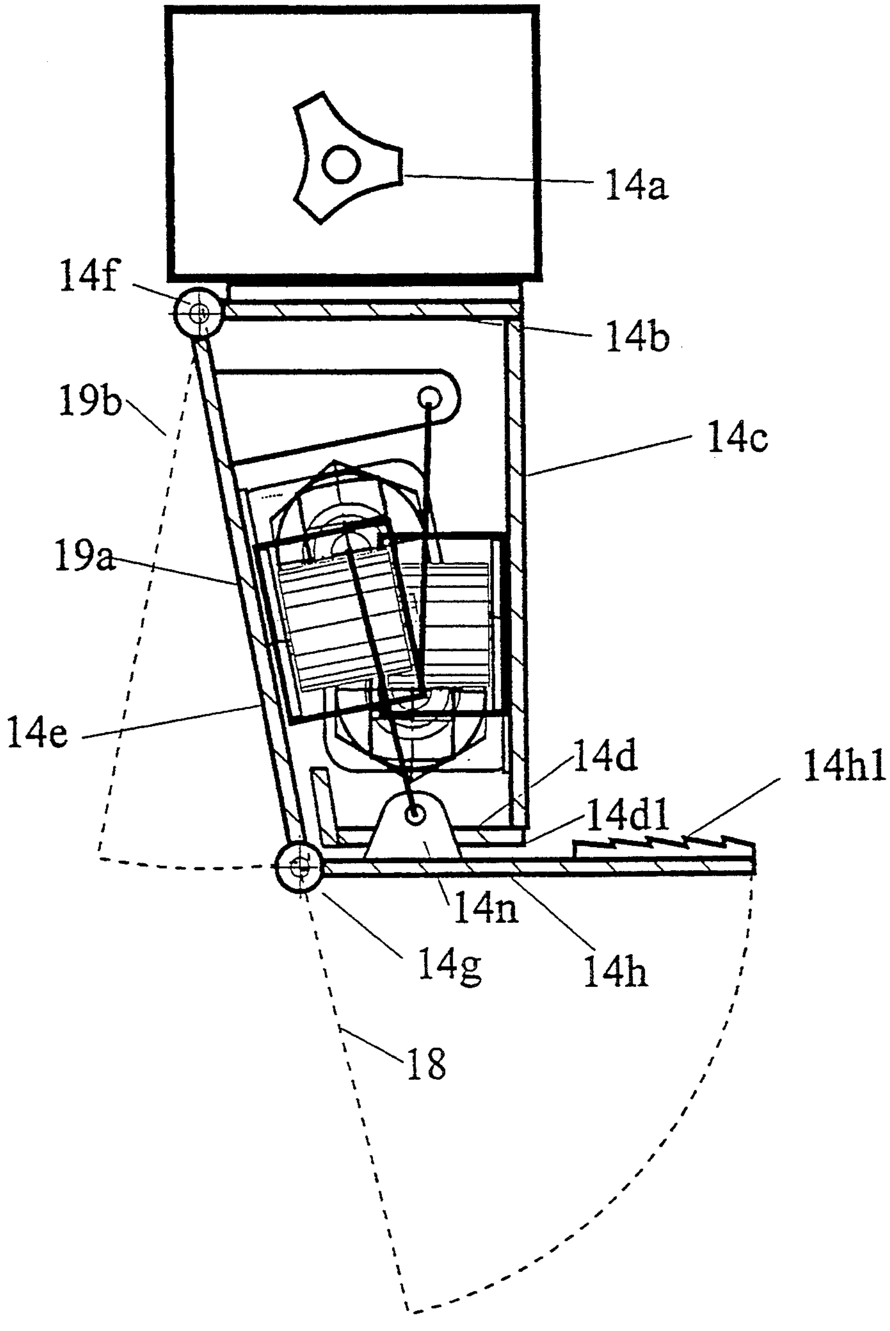
FIGS. 4 and 5 show diagrammatically a cross-section and a longitudinal section, respectively, through a gripping member, which functions as per the method according to the invention FIGS. *6a–6e* illustrate the course of a removal of a product from a screen table.
Figure 5:
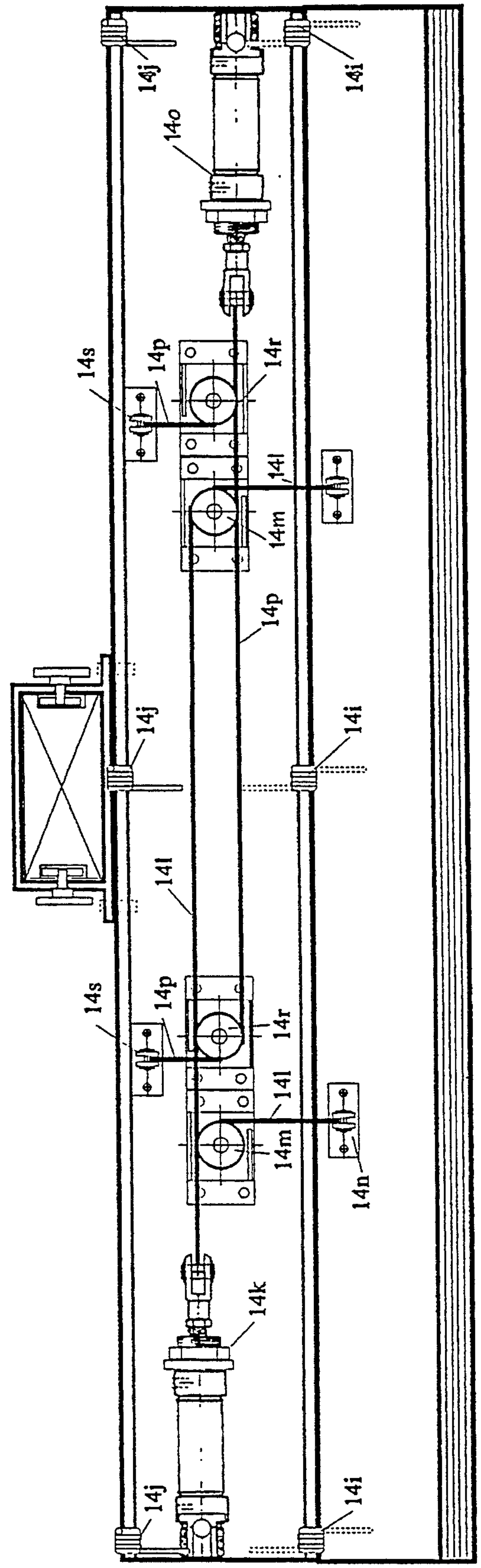

The construction of a removal member 14 according to the invention will now be explained by way of example and with reference to FIGS. 4 and 5. According to the embodiment shown in the drawing in said figures, a removal member 14 comprises an elongate, box-shaped frame with an upper wall 14*b*, a side wall 14*c* and a lower wall 14*d*. A positioning plate 14*e*, which forms the wall of the box opposite the wall 14*c*, is connected at its upper edge, in an articulated manner by means of a hinge joint 14*f*, to the frame via the free edge of the upper wall 14*b*, and is connected at its lower edge, in an articulated manner by means of a hinge joint 14*g*, to a gripping plate 14*h*. Springs 14*i* tend to force the gripping plate 14*h* to assume a position indicated by a broken line 18. The positioning plate 14*e* is acted upon in an analogous manner by springs 14*j* so as to assume the position indicated by broken line 19*a*. Working counter to the action of the springs 14*i* is a compressed-air-activated cylinder/piston assembly 14*k*, whose piston rod is in operative connection, via cords 14*l* and guide rollers 14*m*, with slewing brackets 14*n* fixed on the gripping plate 14*h* in order to cause the latter to assume the position shown in FIG. 4. Working in a corresponding manner, counter to the action of the springs 14*j*, is a compressed-air-activated cylinder/piston assembly 14*o*, whose piston rod is in operative connection, via cords 14*p* and guide rollers 14*r*, with slewing brackets 14*s* fixed on the positioning plate in order to cause the latter to assume the position indicated by broken line 19*b* in FIG. 4.

The function of a removal member 14 and, consequently, the course of the removal itself will now be explained with reference to FIGS. 4, 5 and, in particular, 6.

Figure 2:
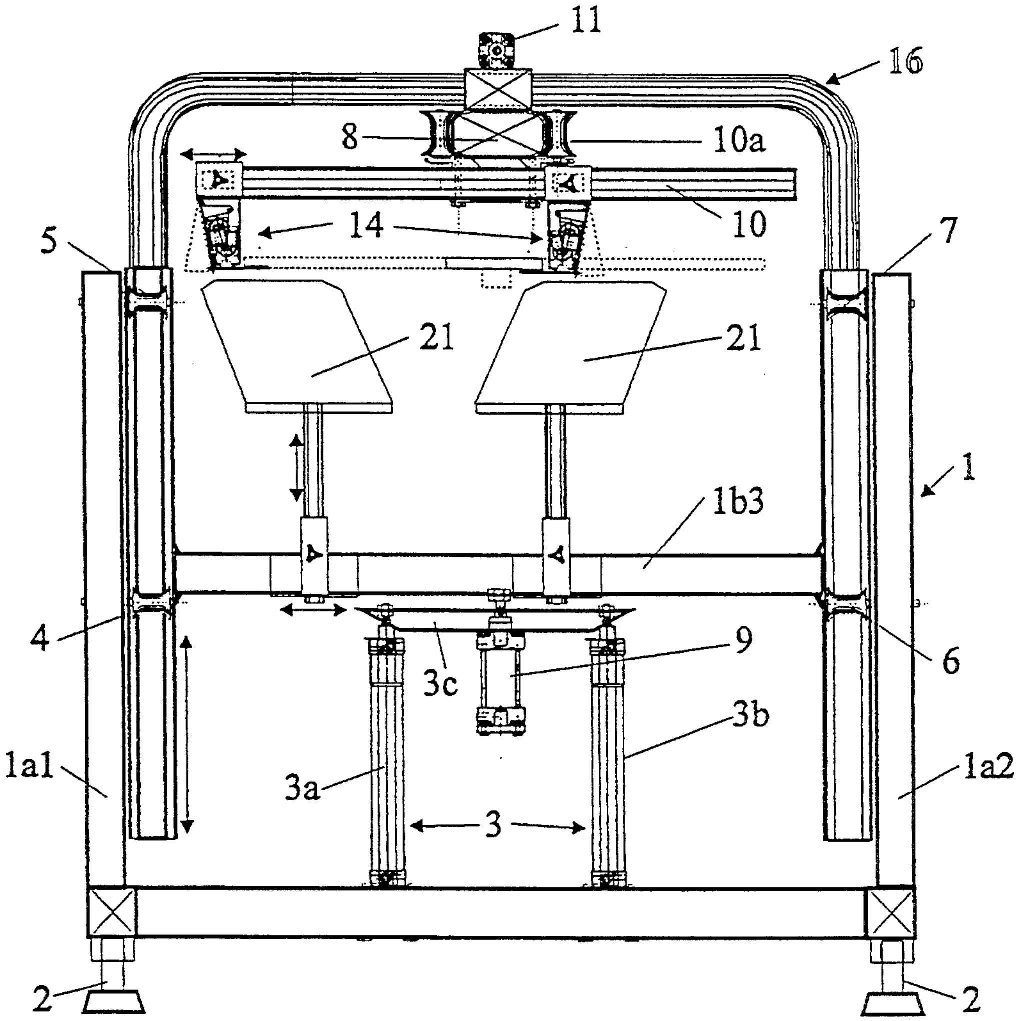
Figure 6A:
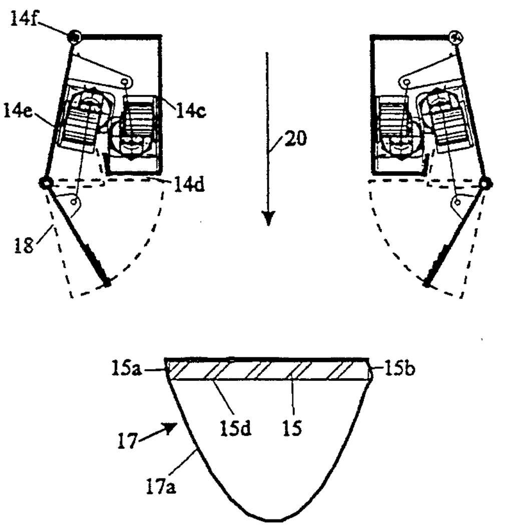

In FIG. 6*a* the removal members 14 are shown in their starting positions situated above the screen table 15 with a finish-printed product 17, which is to be removed from the table 15. The positioning plate 14*e* and the gripping plate 14*h* have the positions indicated by the broken lines 19*b* and 18, respectively, that is to say the cylinder/piston assembly 14*k*, 14*o* is unaffected. An arrow 20 indicates that the removal members 14 are lowered to the position shown in FIG. 6*b* in which the walls 14*c* of the removal members 14 are tangent to the side edges 15*a*, 15*b* of the screen table 15. The lowering movement is effected here by means of a relative movement between the stand parts la, 1*b* produced by means of the cylinder/piston assemblies 3*a*, 3*b* (FIG. 2). It may be mentioned here, that this lowering movement can alternatively be effected in cooperation with the cylinder/piston assembly 9 or by this alone. The crucial point is that the movement is to be effected quickly and with great accuracy. A general adjustment to the height of the screen table can, in contrast, be allowed to take place comparatively slowly.

Figure 6B:
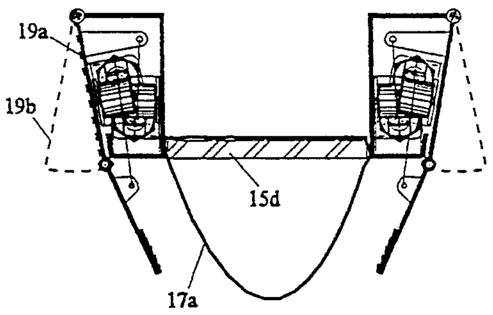
Figure 6C:
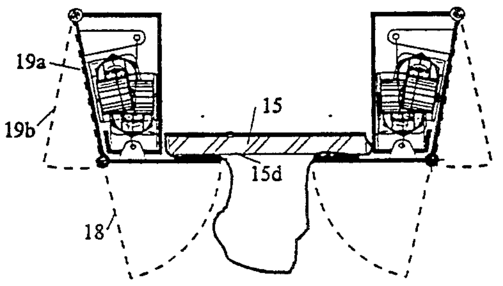
Figure 6D:
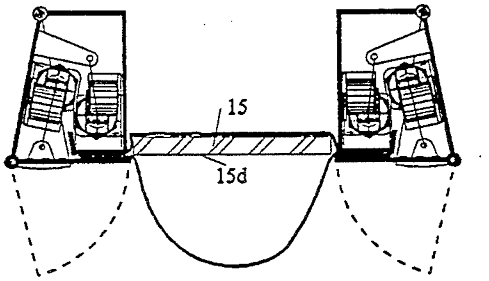
Figure 6E:
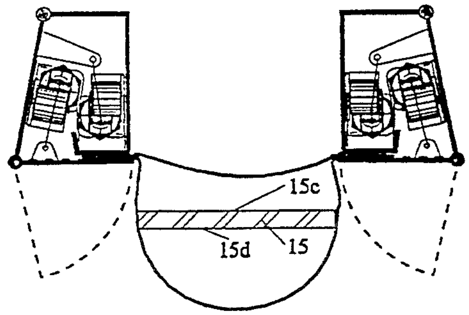

The positioning plates 14*e* are now first turned, under the action of the springs 14*j*, from the position indicated by a broken line 19*b* to the position shown in FIG. 6*b*, in which each positioning plate 14*e* closes off the box profile of the frame. Thereafter, the gripping plates 14*h* are turned upwards, under the action of the cylinder/-piston assembly 14*k*, to the position shown in FIG. 6*c*, in which a part 14*h*1 of the top side of the gripping plate, which side is preferably provided with a friction-increasing surface structure, presses a corresponding portion of the loose part 17*a* against the underside 15*d* of the screen table 15. A double-folded piece of the loose part 17*a* of the product 17 is now clamped securely between the top side 14*h*1 of the gripping plate 14*h* and the underside 15*d* of the table 15. The cylinder/piston assembly 14*o* is now brought into action, which results in the positioning plates on the two removal members being forced to assume, counter to the action of the springs 14*j*, the position indicated in FIG. 4 by broken line 19*b*. As the friction between the underside 15*d* of the screen table 15 and the portion of the product 17 bearing against this is overcome, a double-folded portion of the product is now clamped between the frictional surface 14*h*1 of the gripping plate 14*h* and the underside 14*d*1 of the wall 14*d*, which underside 14*d*1 thus forms a counter-pressure surface.

Figure 3:
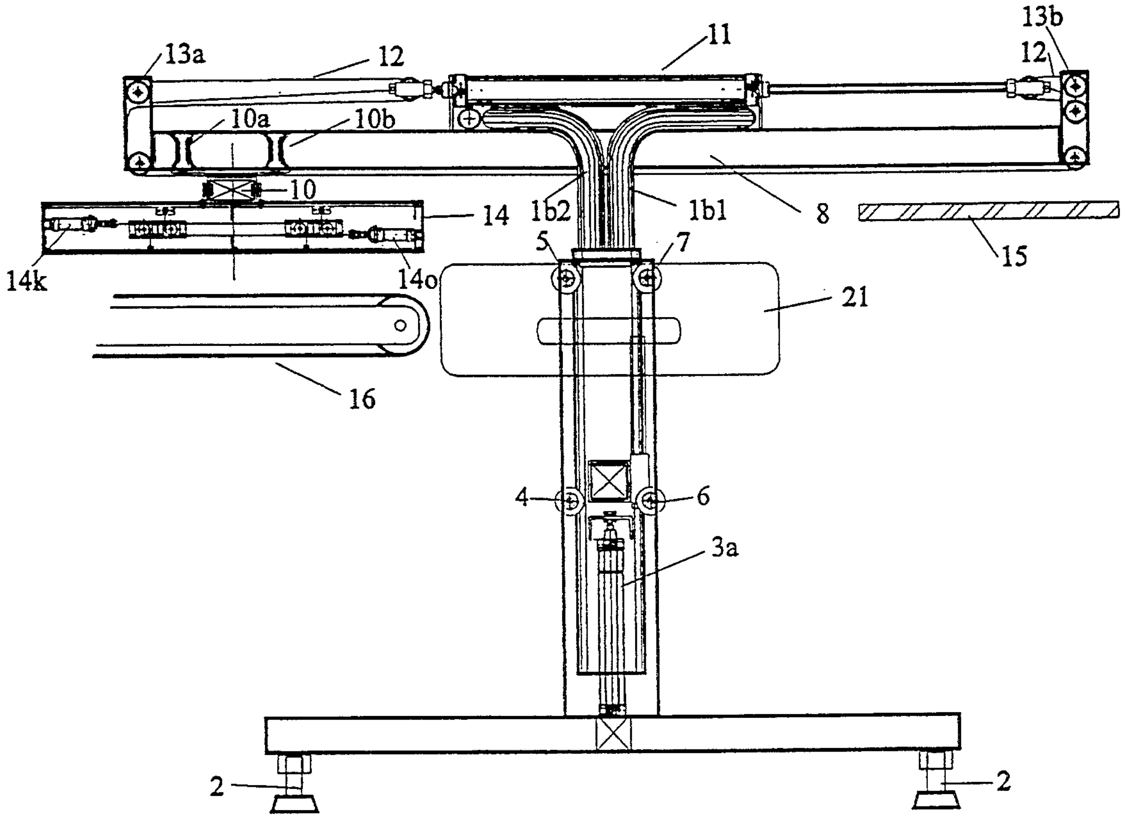

Under the effect of the cylinder/piston assembly 9 and/or the cylinder/piston assemblies 3*a*, 3*b*, a relative movement is obtained between the stand parts 1*a*, 1*b*, which results in the removal members 14 being lifted counter to the direction of the arrow 20, so that the product is freed from the adhesive top side of the screen table 15. Now the removal members 14 with the product 17, fixed in these by means of the cylinder/piston assembly 11, can be displaced along the traverse beam 8 to the position shown in FIG. 3, where the product is released by means of the fact that the cylinder/piston assemblies 14*k*, of the springs 14*i*, cease to function, as a result of which the clamping action is released. The product now drops onto the dryer conveyor 16, and the removal members 14 can return to a position above the screen table shown in FIG. 1, in order to await the arrival of a new screen table with finish-printed product.

In order to facilitate the handling of long-sleeved shirts, sleeve guide plates 21 are fixed in a raisable and lowerable manner on the beam 1*b*3.

SUMMARY, RAMIFICATIONS, AND SCOPE

It is obvious that the person skilled in the art can modify in many ways, within the scope of the inventive concept, the arrangement according to the invention explained hereinabove and shown by way of example in the drawing. Thus, for example, the cylinder/piston assembly 9 for the removal of the product from the screen table 15 can alternatively be arranged to act between the stand upper part 1*b* and the traverse beam 8 or between this and the beam 10, in which case corresponding modifications are of course required. It is also conceivable to use, instead of one or more of the cylinder/piston assemblies, other types of drive members with a comparable action and function.

I claim:

1. A method for removing a finish-printed product (17), for example a T-shirt, from a screen table (15) designed with an adhesive top side (15*c*) and two side edges (15*a*, 15*b*) which are approximately parallel to a direction of removal of the product from the table (15), onto which table (15) the product (17) was pulled before a printing operation was begun, in order to serve as an underlayer for the product (17) during the printing operation, during which, a part (17*a*) of the product (17) hangs loosely under the table (15), comprising the steps of:
   - pressing areas of the product parts (17*a*) against an underside (15*d*) of the table (15) lying inside and substantially along the entire length of said side edges (15*a*, 15*b*),
   - conveying the areas of the product parts (17*a*) in opposite horizontal directions such that a friction between the product parts (17*a*) and the underside (15*d*) of the table (15) is overcome, so that each area of the product part (17*a*) comes to lie outside each side edge (15*a*, 15*b*), of the table (15),
   - executing a vertical relative movement between said clamping areas and the table (15) so that the product (17) is released from the adhesive top side (15*c*) of the table (15),
   - displacing the product (17) in the direction of removal of the product (17) from the table (15),
   - loosening the clamping areas on the product parts (17*a*) so that the product is able to drop onto a dryer conveyor (16).

2. An arrangement for removal of a finished-printed product (17), such as a T-shirt, from a screen table (15) designed with an adhesive top side (15*c*) and two side edges (15*a*, 15*b*) which are approximately parallel to a direction of removal of the product (17) from the table (15), onto which table (15) the product (17) is pulled before a printing operation is begun, in order to serve during the printing operation as an underlayer for the product (17), which product, during the printing operation, has a part (17*a*) hanging loosely under the table (15), and for placing the product (17), after removal thereof, on a dryer conveyor (16), the arrangement comprising:
   - a stand,
   - removal members (14) movably mounted on the stand, at least in the direction of removal of the product (17),
   - means for bringing the removal members into engagement with the finish-printed product (17),
   - said removal members (14) in the area around each of said side edges (15*a*, 15*b*) having an upwardly directed engagement surface (14*h*1) which extends substantially along the entire length of the side edges (15*a*, 15*b*), and a downwardly directed counter-pressure surface (14*d*1), wherein the engagement surface (14*h*1) is designed to press a portion of the loosely hanging part (17*a*) of the product (17) against an underside (15*d*) of the table (15) within the side edges,
   - said means for bring the removal members into engagement with the finish-printed product (17) including means for displacing the removal members (14) in opposite horizontal directions transverse to the direction of removal while overcoming a friction between the underside (15*c*) of the table (15) and the product (17) so that the product (17) is clamped between the engagement surface (14*h*1) and the counter-pressure surface (14*d*1),
   - means for providing a vertical relative movement of the removal members (14) so that the product (17) is released from the adhesive top side surface (15*c*) of the table (15),
   - means for providing a horizontal displacement of the removal members (14) so that the product (17) is situated away from the table (15), and
   - means for releasing the product (17) so that the product may be dropped onto the conveyor (16).

* * * * *